US000001941H

(19) United States

(12) Statutory Invention Registration (10) Reg. No.: US H1941 H

Hoffpauir et al. (43) Published: Feb. 6, 2001

(54) AGENT INTERWORKING PROTOCOL AND CALL PROCESSING ARCHITECTURE FOR A COMMUNICATIONS SYSTEM

(75) Inventors: Scott D. Hoffpauir, Collierville; Kelvin K. Kinsey; Steve B. Liao, both of Memphis, all of TN (US)

(73) Assignee: DSC/Celcore, Inc., Plano, TX (US)

(21) Appl. No.: 09/026,505

(22) Filed: Feb. 19, 1998

Related U.S. Application Data

(60) Provisional application No. 60/060,107, filed on Sep. 26, 1997.

(51) Int. Cl.[7] ..... H04M 1/00

(52) U.S. Cl. ..... 379/265

*Primary Examiner*—Daniel T. Pihulic

(74) *Attorney, Agent, or Firm*—John G. Flaim

(57) ABSTRACT

A call processing architecture treats a call connection as having two halves an originating half and a terminating half. An agent is associated with each call half, the originating agent being assigned by a switching center of a telecommunications system to establish the originating half of a call. The originating agent interacts with a translator and router to process the dated digits for a call to route the call to a terminating agent, the terminating agent establishing the terminating half of the call to complete the call connection. An agent interworking protocol (AIP) provides a generic superset protocol containing the common elements and unique elements for all call types so that an originating agent converts its call messages to the AIP and is connected to a terminating agent via an AIP connector, the terminating agent converting the AIP formatted call messages to the native protocol of the terminating agent. Agents for different call types are each able to convert call messages to or translate call messages from the agents's unique protocol to the AIP format and each type of agent does not need to know the type of agent being connected to as communication with other agents is via the AIP.

13 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 3
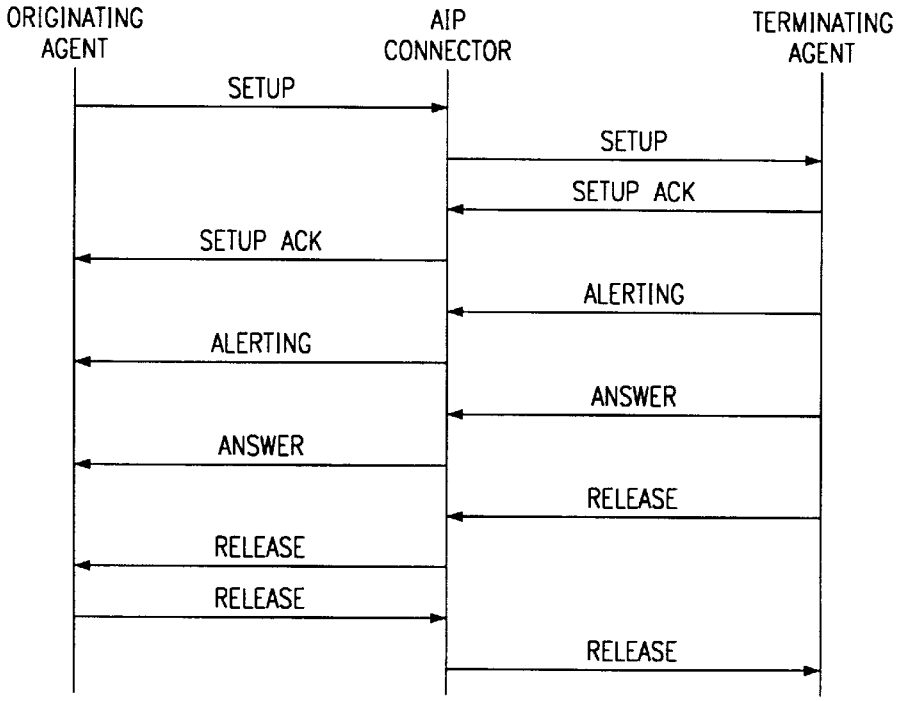
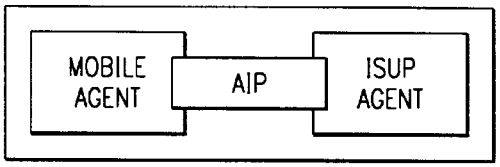
FIG. 4
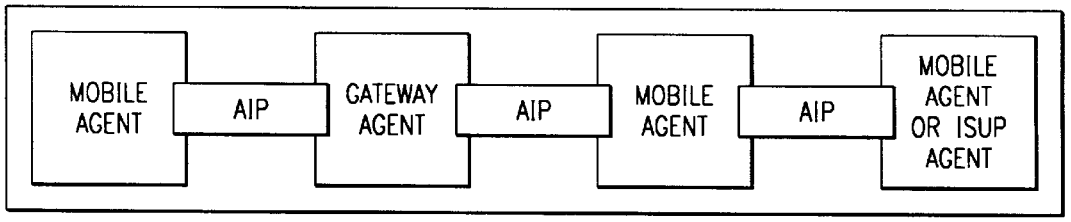
FIG. 5

AGENT INTERWORKING PROTOCOL AND CALL PROCESSING ARCHITECTURE FOR A COMMUNICATIONS SYSTEM

CLAIM OF PRIORITY

The instant patent application claims priority from the United States provisional patent application designated with Ser. No. 60/060,107, entitled Cellular Communication System, filed on Sep. 26, 1997.

FIELD OF THE INVENTION

The present invention relates to call processing in a communications system. More particularly, the present invention relates to a call processing architecture and a generic call message protocol for processing multiple types of calls.

BACKGROUND INFORMATION

In wireless communications systems, such as an Analog Mobile Phone System (AMPS) or a Global Standard for Mobile Communications (GSM) system, call processing includes call origination and termination. For example, a call originated by a wireless calling party to a wireline called party must be connected through a mobile communications network, such as a Public Land Mobile Network (PLMN), to a land-based communications network, such as a Public Switched Telephone Network (PSTN). The setup of the call, however, often involves different types of calls (e.g., different trunking protocols such as GSM, ISUP, TIJP and R2) required to establish a call connection, each trunking protocol requiring a call state machine capable of originating and terminating calls for the particular call types. Each call state machine can generate and communicate its own types of messages (e.g., call setup signaling) but the call setup messages for different call types are incompatible with the call setup messages of other call types. Call setup messages include information such as calling party number, called party number, call type (e.g., data or voice) and other information needed by the particular call type.

In conventional communication systems, there may be a single agent, for example a software entity, capable of handling the call messaging for all call types or an agent for each call type involved in establishing a call connection. A problem arises, however, in the interworking of the different external interfaces for different call types as the call signaling for each call type involved in establishing a single call connection may be unique and incompatible with other call type signaling. Thus, in conventional communication systems, each agent (whether a single agent for all call types or a separate agent for each call type) requires knowledge of each call type handled by the communications system, thereby adding complexity to each agent as well as presenting integration and maintainability problems as more call types are added to the communications system.

SUMMARY OF THE INVENTION

According to an exemplary embodiment of the present invention, a call processing architecture processes each call as having an originating half and a terminating half and an agent is assigned to setup, process and terminate each call half. An originating agent is assigned by, for example, a switching center of a telecommunications system. The originating agent establishes an originating half of a call and interacts with a translator and router to process the dialed digits and route the call to a terminating agent, the terminating agent establishing the terminating half of the call and thereby completing the call connection. If the terminating agent cannot complete the call or needs to redirect the call for any reason, additional agents can be connected to the terminating agent as necessary to complete the call, a terminating agent also being capable of operating as an originating agent.

For example, if a call originates on a mobile network, such as a GSM system, then a mobile agent would control the call setup on the mobile network, e.g., control the connection of the mobile station to the base station controller (BSC) and mobile switching center (MSC) of the mobile network. The mobile agent could reside, for example, in the call processor portion of the MSC which in turn controls a resource shelf containing the line cards which physically perform the setup of the call. Thus, the mobile agent establishes the originating half of the call. The mobile agent would interact with a translator and router to determine the terminating agent and facilitate connection of the originating and terminating agents. Assuming, for example, that the call is to be routed to a PSTN of the called party, it is likely that Signaling System 7 (SS7) is used for signaling on the PSTN. As part of SS7, Integrated Services Digital Network User Part (ISUP) provides for transfer of call setup signaling information between signaling points. Thus, to complete the call, an ISUP agent, for example also residing in the MSC, would be allocated as the terminating agent to control the setup of the call to the PSTN via the ISUP protocol, thus establishing the terminating half of the call. Similarly, if the destination network of the terminating half of the call required the TUP protocol (e.g., Telephone User Part, the predecessor to ISUP) or the R2 protocol (e.g. the European analog and digital inband trunk signaling protocol) or any other protocol, an agent for each protocol would be available so that each call type could be processed by the mobile network to establish the complete connection for the call.

According to another exemplary embodiment of the present invention, an agent interworking protocol (AIP) provides a generic call setup protocol. The AIP according to the present invention provides a superset protocol containing the common elements and unique elements for all call types. Thus, according to an embodiment of the present invention, an originating agent converts its call setup message to the AIP and is connected to a terminating agent via an AIP connector, the terminating agent converting the AIP formatted call setup message to the protocol of the terminating agent. Thus, according to an embodiment of the present invention, agents for different call types are each able to convert call setup messages to or translate call setup messages from the agents's unique protocol to the AIP format. As a result, each type of agent does not need to know the type of agent being connected to and only needs to communicate with other agents via the AIP according to the present invention.

BRIEF DESCRIPTION OF THE DRAWINGS

FIG. 3 illustrates an exemplary agent interworking protocol flow according to an embodiment of the present invention.

FIG. 4 illustrates exemplary agent connections using an agent interworking protocol according to an embodiment of the present invention.

FIG. 5 illustrates exemplary agent connections using an agent interworking protocol according to an embodiment of the present invention.

DETAILED DESCRIPTION OF TIME INVENTION

Figure 1:
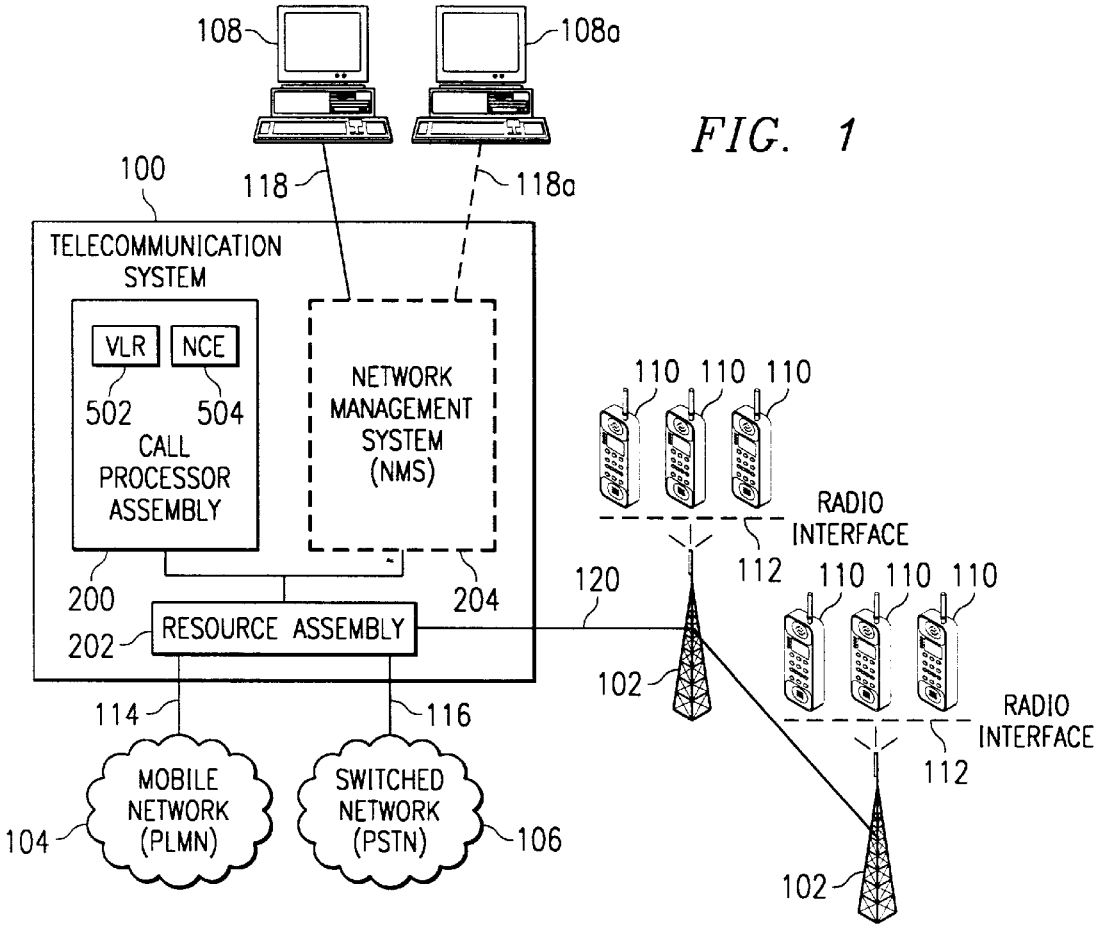
FIG. 1 illustrates an exemplary wireless communication system according to an embodiment of the present invention

FIG. 1 illustrates an integrated, wireless telecommunications system 100 and certain connections associated with that telecommunications system 100, in accordance with one embodiment of the present invention. The telecommunications system 100 is operable to provide speech and data services to multiple subscriber units 110. Each subscriber unit 110 provides an interface to a human user, such as through use of a microphone, loudspeaker, display or keyboard of a subscriber unit, or provides an interface to terminal equipment, such as an interface towards a personal computer or facsimile machine, or both. While the subscriber units 110are illustrated in FIG. 1 as hand held mobile units, it should be appreciated that the subscriber units are not so limited. For example, the subscriber units 110 may comprise a fixed antenna assembly connected to a telephone or other interface device. A smart card (not illustrated) may be embodied within a subscriber unit 110 to provide such subscriber unit with subscriber related information and encryption keys.

Communications to and from the subscriber units 110 are established over a radio interface 112 by one or more base stations 102. The base station(s) 102 directly communicate with the subscriber units 110 over radio frequency signals transmitted from, and received by, the base stations over the radio interface 112. The base station(s) 102 may, for example, include radio transmission and reception devices, antenna assemblies and signaling processing logic specific to the radio interface 112 between the base station(s) and the subscriber unit(s) 110.

A base station 102 is preferably responsible for providing communications to subscriber units 110 located within a particular region, commonly referred to as a service area or cell. One or more base stations 102, typically in a common area, may be logically grouped into what is commonly referred to as a site. Further, it should be appreciated that the base station(s) 102 may be interconnected in various ways. For example, base stations 102 may be interconnected in a star configuration or in series with respect to one another. The telecommunications system 100 is connected to the base stations 102 by a link 120, such as an E1 or T1 telecommunications line, that provides one or more suitable transmission channels. Digital representations of speech or data information are transmitted over the link 120 between the telecommunications system 100 and the base station(s) 102, at a predetermined transmission rate.

The telecommunications system 100 is further connected to a mobile network 104 over a link 114 and a switched network 106 over another link 116. The switched network 106, for example, the Public Switched Telephone Network or PSTN, typically carries voice and data services to fixed locations. Signals transmitted over the switched network link 116 may therefore include ISUP and R2 type signals. Similarly, the mobile network 104, for example, the Public Land Mobile Network or PLMN, typically carries voice and data services to mobile units. Signals transmitted over the mobile network link 114 may therefore include SS7 and MAP type signals in addition to IStJP and R2 type signals. Configuration of the telecommunications system 100 is preferably accomplished by a graphical user interface associated with a local terminal 108 over a wireline connection 118 or by a remote terminal 108*a* over a modem link 118*a*.

A resource assembly is preferably included within the telecommunications system 100. That resource assembly 202 is preferably connected, either directly or indirectly, to the base station(s) 102 over one link 120, the switched network 106 over another link 116, and the mobile network 104 over yet another link 114. Within the telecommunications system 100, the resource assembly 202 is preferably connected to a call processor assembly 200 as well as a network management system 204. The resource assembly 202, in addition to providing an interface to the base station(s) 102, the switched network 106 and the mobile network 104, includes resources that are available to be used by the call processor assembly 200.

The call processor assembly 200 includes elements that are operable to process calls directed to, or received from, the subscriber units 110. The call processor assembly 200 is operable to handle call processing functions needed by the telecommunications system 100, including call orig(ination, location updating, handovers between cells, trunking and call termination. The call processor assembly 200 is a general purpose computing platform, such as an Intel Pentium II based computing platform, that comprises suitable hardware and/or software systems to support telecommunications processing. The call processor assembly 200 may use a real-time operating system such as a QNX operating system to support the real-time call processing requirements of telecommunications system 100.

As illustrated, a network management system 204 may be embodied within the telecommunications system 100 or external to the telecommunications system 100. Certain elements of the network management system 204 are preferably provided within the telecommunications system 100 while others are provided externally. However, the present invention may be practiced regardless of how the network management system 204 is implemented. The network management system 204 is responsible for operation, administration and maintenance functions for the telecommunications system 100 and includes, for example, configuration management, performance management, accounting manag ement, fault management, system test and startup and recovery. It should also be appreciated that while the call processor assembly 200, resource assembly 202 and network management system 204 are illustrated as distinct entities, some or all of the functionality of those entities nevertheless may be integrated into a single entity consistent with the spirit and scope of the present invention.

The call processor assembly 200 of the telecommunications system 100 preferably includes two elements, namely, a radio controller 302 together with a switching center 304. The radio controller 302, which may also be located separate from the call processor assembly 200, is responsible for management of the base station(s) 102 and their radio interfaces 112, including the allocation and release of radio channels associated with a given radio interface 112 and management of handovers from one base station 102 to another base station 102. The radio controller 302 manages radio transmission equipment associated with the base station(s) 102 and may be responsible for management of the radio interfaces 112 through the allocation, release, and handover of radio transmission channels.

The radio controller 302 may carry out various procedures that relate to call connection tasks. For example, the radio controller 302 may be responsible for system information broadcasting, subscriber paging, immediate traffic channel assignment, subsequent traffic channel assignment, call handover, radio connection and release, connection failure detection and reporting, and power capability indication reporting. One example of a radio controller 302 is a base station controller (BSC).

The switching center 304 coordinates the allocation and routing of calls involving subscriber units 110 by, among other things, receiving dialed digits, interpreting call processing tones and providing routing paths. For example, the switching center 304 is operable to process a service request from a subscriber terminal 110 and route a corresponding call to the designated switched network 106, a mobile network 104 or to another subscriber terminal 110. Similarly, the switching center 304 is operable to process a service request from a mobile network 104 or switched network 106 and route a corresponding call to a designated subscriber unit 110. The switching center is primarily responsible for mobility management, call control and trunking, such as coordinating the setting up and termination of calls to and from subscriber terminals 110. Additionally, it provides all of the functionality needed to handle mobile subscriber units 110 through location updating, handover and call delivery.

The software architecture of the telecommunications system 100 is preferably based on object-oriented software engineering technology, and the use of managed objects provided within the network management system 204 and the call processor assembly 200. Managed objects are provided to support system logical attributes and administrative functions. Managed objects model the various functional, hardware, and interface components and sub- components associated with the telecommunications system 100. Such software may also model the functional procedures performed by physical components. Managed objects can be created, modified, and deleted by an operator, for example via the network management system 204.

Figure 2:
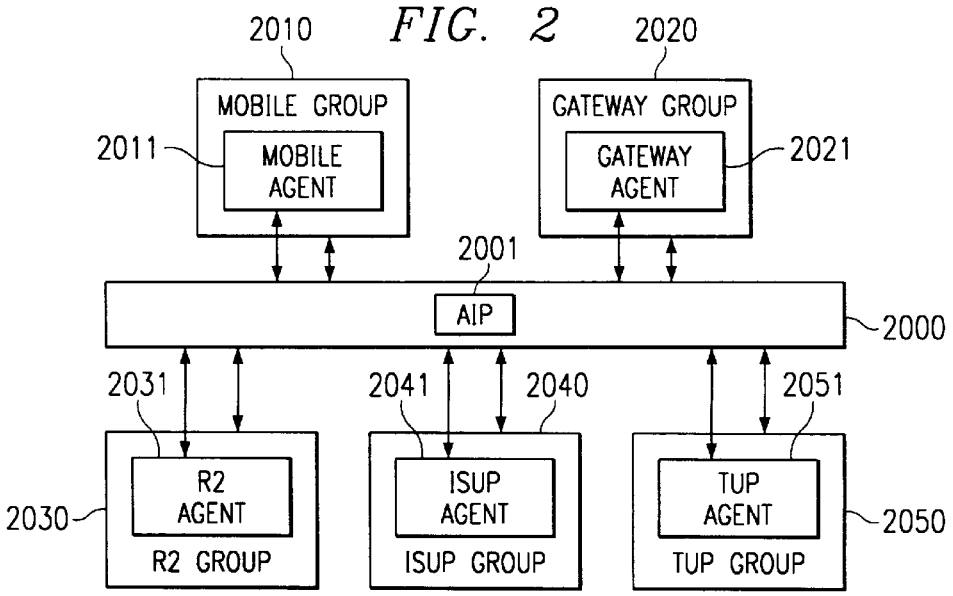
FIG. 2 illustrates agents connected to a translator and router according to an exemplary embodiment of the present invention.

FIG. 2 illustrates agent groups 2010–2050 connected to a translator and router 2000 according to an exemplary embodiment of the present invention. As shown in FIG. 2, agent groups 2010–2050 include, for example, mobile connection group 2010, gateway group 2020, R2 group 2030, ISUP group 2040 and TUP group 2050. R2 group 2030, ISUP group 2040 and TUP group 2050 can also be referred to as trunk groups. Each group includes agents with the same characteristics. For example, the mobile connection group 2010 includes mobile agents 2011 so that there is a mobile agent 2011 for each dedicated connection between a subscriber terminal 110 and the mobile network (e.g., one agent represents one call half). Similarly, gateway group 2020 includes gateway agents 2021, R2 group 2030 includes R2 agents 2031, ISUP group 2040 includes ISUP agents 2041 and TUP group 2050 includes TUP agents 2051. Agent groups could also be provided for any other desired operation, such as, for example, loop backs (e.g., for testing), test tones, test announcements and record announcements.

According to an exemplary embodiment of the present invention, the following call processing architecture is used to build a call, e.g., establish a call connection. With reference to FIGS. 1 and 2, a call is originated on a PLMN 104, PSTN 106 or by a subscriber terminal 110. The call is initiated by, for example, the calling party entering the dialed digits for the called party. The call connection is established by connecting a protocol (e.g., state) machine for the calling party (e.g., a MSC for a PLMN or a switching center for a PSTN) with a protocol machine for the called party. According to an embodiment of the present invention, the call connection is treated as having two halves—an originating half and a terminating half. Each call half is associated with an agent group and an agent of the agent group.

Agent groups and agents are illustrated in FIG. 2. An agent, such as a mobile agent 2011 or an ISUP agent 2041 is, for example, a software entity that provides a call state machine for a particular call type (e.g., mobile, ISUP or R2). Each agent, which can function as an originating agent, a terminating agent or both, has, for example, an external interface and an internal interface. The internal interface provides the ability to communicate with another agent or elements of the telecommunications system while the external interface allows communication using the native protocol call messages for the particular call type (e.g., mobile, ISUP, R2, etc.). Thus, the internal interface of each agent includes the capability to convert between the native protocol call message format and the call message format of other agents. An agent could also include the capability of converting between its unique signaling format (e.g., native protocol) and a standard format as described in detail below regarding an agent interworking protocol according to an embodiment of the present invention. The functions performed by each agent include, for example, call setup, call processing and call termination. An agent group is also, for example, a software entity that represents a collection of agents of the same type, as illustrated in FIG. 2. As explained in more detail below, an agent group has its own behavior which includes, for example, selecting agents for establishing call connections when requested and registering the agent group with a translator and router so that the agent group can be used to route calls, also as described below.

In an embodiment of the present invention, agents follow a set of basic rules in establishing a call connection. For example, each agent interacts with a translator and router to process the dialed digits for a call (generally referred to as translation, although modification of the dialed digits is not always required) and determine a route for establishing a connection with a terminating aoent. According to an exemplary embodiment of the present invention, a translator and router, for example indicated as 2000 in FIG. 2, helps isolate an originating agent (e.g., the agent handling the originating half of the call) from the responsibilities of obtaining a terminating agent (e.g., the agent handling the terminating half of the call). The translator and router 2000 facilitates the selection of a terminating agent via interaction with the originating agent. For example, upon receipt of the dialed digits, the originating agent can make a translation request to the translator and router 2000 to perform any processing of the dialed digits required by the telecommunications system. Another request can be made by the originating agent to the translator and router 2000 that the processed digits be used to identify a route for completing the call connection. Thus, the translator and router 2000 can use the processed digits to determine a route by, for example, determining the agent group associated with the processed dialed digits and requesting that the agent group identify an idle agent to serve as a terminating agent for the call, an ID being provided to the originating agent and the terminating agent to identify a connection path between the originating and terminating agents.

Thus, in the call processing architecture according to an embodiment of the present invention, upon a call attempt, an originating agent is allocated by the switching center of the telecommunication system and the originating agent receives the dialed digits via its external interface. The originating agent then sends a translate request to a translator and router and in response receives an acknowledgment message and the results of the request (e.g., the processed dialed digits). The processed dialed digits are generated, for example, via translation tables in the translator and router described in more detail below. The originating agent then sends a route request to the translator and router along with the processed dialed digits and a connector ID. The connector ID represents, for example, a software entity for a communication path between the originating and terminating agents. In response to the route request, the translator and router determines a route (e.g., the agent group for the terminating agent) via, for example, a routing table in the translator and router, described in more detail below.

The translator and router then sends a request to the identified agent group that an idle agent be identified for completing the call connection. The connector ID from the originating agent is also provided to the agent group identifying a connection path between the originating and terminating agents. While the connector ID is determined by the originating agent the translator and router or the terminating agent could also allocate the connector ID. The agent group polls its pool of agents and if an idle agent is found, an acknowledgment message is returned to the translator and router and also forwarded to the originating agent. The connector ID is provided to the terminating agent by the terminating agent group. Thus, the originating agent can now complete its connection with the terminating agent to allow dialogue between the agents and also tear down of the call connection at termination of the call via the allocated connection path. If the terminating agent determines that the call needs another type of agent (e.g., due to redirection, call forwarding, etc.), the terminating agent can also act as an originating agent and, through the same actions described above, interact with the translator and router to identify the next agent needed to process the call, all of the agents being connected until the call is setup. Thus. the call processing architecture according to the present invention allows call connections to be built by connecting agents for each half of a call connection, allowing multiple agents to be connected together if necessary until the call connection is established.

In an embodiment of the present invention, mobile agents 2011 are responsible for establishing a mobile originated or mobile terminating connection between the switching center 304 and a subscriber terminal 110. Accordingly, mobile agents 2011 communicate with the Mobile Application Part (MAP) protocol which addresses registration and hand-off of subscriber terminals. Mobile agents 2011 are also responsible for interworking with a second agent in the role of call originator or terminator. R2 agents 2031 are responsible for establishing a connection between the switching center 304 and a PSTN using the R2 protocol and also interworking with another agent in the role of call originator or terminator. Gateway agents 2021 are responsible for routing calls destined for subscriber terminals 110 (e.g., mobile network calls). For example, if the destination subscriber terminal 110 is visiting the gateway agent's switching center, the call will be routed to a mobile agent 2011. However, if the destination subscriber terminal 110 is currently visiting a switching center other than the gateway agent's switching center, then the call will be routed to a trunk agent, such as a R2 agent 2031. ISUP agent 2041 or TUP agent 2051 to connect the call to the mobile network servicing the destination subscriber terminal 110. ISUP agents 2041 are responsible for establishing a connection between the switching center 304 and the PSTN using, for example, the ITU White Book ISUP protocol or the ETSI V2 ISUP protocol and also interworking with another agent in the role of call originator or terminator.

Like the agents 2011–2051 which are implemented as software objects in the switching center 304, the translator and router 2000 can also be implemented in software in the switching center 304, for example as a software object. The translator and router 2000 manages all the call translations and routing functions for the agents. As is known in the art, when a subscriber terminal 110 originates a call, the subscriber terminal's dialed number is transferred, as it is dialed, to the telecommunications system 100. A translation process, implemented in the translation and router 2000, converts the dialed number into a generically formatted telephone number. The translation process may include, for example, the prefixing of (e.g., stripping off) area code, long distance or international codes, conversion of service codes (e.g. 411 or 911) into telephone numbers or any other mapping/formatting action decided by the operator of the telecommunication system 100. The dialed number may also pass untranslated through the translator and router 2000. After translation, the router function of the translator and router 2000 routes the translated number towards the correct destination. The router function utilizes routing tables to map a translated number to a route list that contains an ordered list of routes. Routes correspond to agent groups, for example, trunk group names, subscriber terminal terminations, call delivery features or test circuits. The destination may be, for example, a specific outgoing trunk group directed to a PSTN or to a voice mail system or to another subscriber terminal 110 serviced by the telecommunications system 100. For a call terminating at a subscriber terminal 110, once the call arrives at the switching center 304 servicing the subscriber terminal 110, no translation or routing is necessary and the call is set up to the subscriber terminal 110.

The translator and router 2000 includes, for example, a translator subtable with translator entries and a router subtable with router entries. Translation and routing tables are generally different for each type of agent, e.g., each agent group and its associated agents utilize particular translation and routing tables distinct from the tables utilized by other agent groups. The translation and routing tables function to check received digits in a number to modify received digits when required, and to select available routing agents to connect a call. The table can be for example, subfunctions of a Translator/Router object model for an object oriented implementation of the translator and router 2000 in the switching center 304.

A translator subtable represents a table of translator entries and is used for manipulating incoming or outgoing digits. For example, number translation tables can contain entries to strip prefix digits (e.g., 0, 1, 01 or 011 ) from a number, append an area code to a local directory number or map a service code (e.g., 411 or 911) to a local number. Incoming translation tables modify digits to obtain a pattern that will be recognized by the routing function, thus allowing selection of an agent to connect the call. Outgoing translation tables apply to trunk groups only and modify digits to obtain a pattern that will be compatible with the receive digits register in the destination switch. For example, if a destination switch requires a number in a specific format, then outgoing translations can be used to manipulate the number before it is sent to the destination switch. Thus, if the destination exchange requires 1+10 digits, the outgoing translation tables can be used to prefix the "1" in front of the 10 digits.

A translation subtable contains, for example, one or more translation entries, each entry being composed of a MATCH digit pattern and a MODIFY digit pattern. The match pattern is used to match the digits to translate. If a match occurs, then the digits are modified based on the modify pattern. If no match occurs, then the received digits are used and passed on to the router function. The router subtable represents a table of router entries and is used for routing an incoming call. A route subtable contains, for example, one or more routing entries, each entry being composed of a MATCH digit pattern and a ROUTE LIST. The ROUTE LIST identifies one or more agent group names, as described below. Thus, each router entry represents a MATCH digit pattern used to match the processed dialed digits from the translation to the route (e.g., the agent group) which processes the called number. An exemplary translation table and routing table are shown below.

Translation Table

| | MATCH | MODIFY |
|---|---|---|
| ENTRY1 | 0??????? | 901???????? |
| ENTRY2 | 1??????? | 901???????? |
| ENTRY3 | 0??????????? | ?????????? |
| ENTRY4 | 1??????????? | ?????????? |

Routing Table

| | MATCH | ROUTE LIST |
|---|---|---|
| ENTRY1 | 901???????? | TRKGRP1 |
| ENTRY2 | 902???????? | TRKGRP2 |
| ENTRY3 | 77275555555 | GSM |
| ENTRY4 | ?????????? | TRKGRP1 TRKGRP2 |

Figure 6:
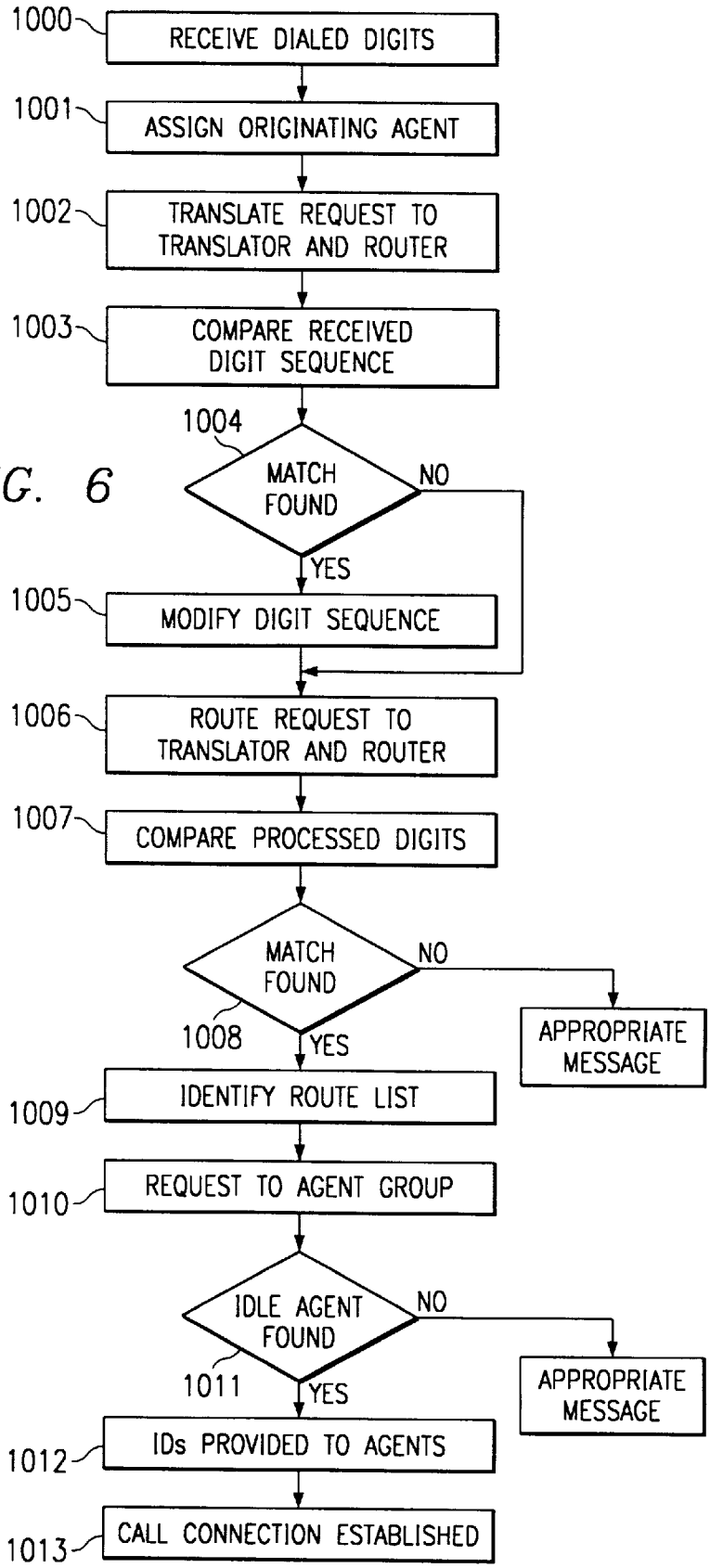
FIG. 6 illustrates an exemplary flow chart of call processing according to an embodiment of the present invention.

FIG. 6 illustrates an exemplary flow diagram of a call processing architecture in accordance with an embodiment of the present invention. A switching center of a telecommunications network such as a mobile switching center 304 receives a digit sequence from a calling party in step 1000 and an originating agent is assigned in step 1001. Depending on the originating location of the call, (e.g., PLMN or PSTN) the assigned agent could be, for example, a mobile agent 2011, an ISUP agent 2041 or an R2 agent 2031. A translation request is made by the originating agent to a translator and router in step 1002. The received digit sequence is translated by use of, for example, an incoming translation index in the translator and router of the switching center 304 in steps 1003–1005. The incoming translation index (e.g., translation table) includes one or more entries, each entry of the incoming translation index including a digit pattern, which is compared and matched to the dialed digit sequence, and a corresponding modified digit pattern, which is used to modify the dialed digit sequence. The incoming translation index first compares the received dialed digit sequence with the various digit pattern entries at step 1003. The incoming translation index then determines whether the received digit sequence matches a digit pattern included in an entry of the incoming translation index at step 1004. If there is a match, then the received digit sequence is modified in accordance with the corresponding modified digit pattern (that is, the modified digit pattern of the entry that included the digit pattern which matched the received digit sequence), at step 1005. If there is no match, however, then the received digit pattern is not modified.

The processed dialed digits are returned to the originating agent, whether or not modified by the incoming translation index, and then a route request is made by the originating agent to the translator and router in step 1006. A route translation index (e.g., routing table) in the translator and router includes one or more entries, each entry of the incoming translation index including a digit pattern, which is compared and matched to the processed digit sequence, and a corresponding route list, which is used to route the call within the telecommunications system 100. Like the incoming translation index, the incoming route index first compares the processed digit pattern, whether modified or not, with the various entries contained in that route index at step 1007. The incoming route index then determines whether the received digit sequence matches a digit pattern of an entry of the incoming route index at step 1008. If there is a match, then the route list corresponding with that digit pattern is identified at step 1009. The translator and router then sends a message to the agent group identified in the route list requesting that an idle agent be provided in step 1001. For example, a trunk group may be identified by the route list for a call that is to terminate to a switched network, whereas a gateway group may be identified by the route list for a call that is to terminate to a subscriber unit 110. If there is no match for the processed digits, however, then an appropriate signal is sent to the network that originated the call, as provided at step 1008. The agent group polls its group of agents to determine if there is an idle agent and if an idle agent is found, the originating connector ID is passed to the terminating agent group and subsequently to the terminating agent, thereby establishing the communication path between the originating and terminating agent. The call connection between the originating agent and the terminating agent is via the connection path and is established in step 1013. The connection path can support the transmission of the unique protocol needed by each agent (e.g., as is known in the art, the originating agent converts its unique protocol to the protocol of the terminating agent) or the transmission of a standard protocol used to communicate between agents, such as an agent interworking protocol according to an embodiment of the present invention described below.

Call origination and termination using the call processing architecture according to an embodiment of the present invention as well as an agent interworking protocol according to an embodiment of the present invention operates as follows, although the agent interworking protocol is not necessary in order carry out the call processing architecture according to an embodiment of the present invention, as any known method of establishing communication between agents could be used with the call processing architecture of the present invention.

Assume a telephone call between a subscriber unit 110 and a called party connected to a PSTN, as illustrated in FIG. 4. When the subscriber unit 110 initiates the call, the subscriber unit 110 transmits a call request signal (e.g., the digits dialed by the calling party) and is connected to the radio controller 302 which is in turn connected to the switching center 304, as illustrated in FIG. 1. Upon receiving the call request signal from the subscriber unit 110, a mobile agent 2011 residing in the switching center 304 is selected by the switching center 304 and establishes the mobile network connection with the subscriber unit 110. For example, the mobile agent 2011 will receive the dialed digits in the unique mobile agent protocol via its external interface and will conduct the mobile network call setup including the assignment of traffic channels. The mobile agent 2011 is now the originating agent.

The mobile agent 2011 sends, for example, a translation request to the translator and router 2000, the translation request including, for example, the dialed number and a translation table index from, for example, an index field of the switching center 304. For example, the translation table index identifies the appropriate translation subtable to use. In the translator and router 2000, a translation subtable is found using the translation table index and the dialed number is indexed into the translation subtable and modified accordingly into a translated number as explained above. For example, the MATCH entries of the translation table are read and if a MATCH is found, the corresponding MODIFY digits are passed back to the originating agent 2011. If the dialed number is not in the subtable, then the translated number is the same as the dialed number. A translate response message is then returned by the translator and router 2000 to the mobile agent 2011 including the translated (e.g., processed) number.

The mobile agent 2011 then sends a routingy request to the translator and router 2000 including the translated number, the connector ID and a route table index from a routing index field of the switching center 304. For example, the routing index field identifies the appropriate routing subtable to use. The route subtable is found using the route table index. The translator and router 2000 then indexes the translated number into the route subtable and the route list is obtained as explained above. For example, the MATCH entries of the route table are read and if a MATCH is found for the translated number, the corresponding ROUTE LIST is used to select a terminating agent group. As a result of identifying the call destination, in this example destined for a PSTN, the translator and router 2000 sends a select request message including the connector ID to the ISUP trunk group 2040 that an idle ISUP agent 2041 be identified. The ISUP trunk group 2040 polls its pool of ISUP agents 2041 and if an idle agent 2041 is found, indicated by a select ACK message, then a connector reference (e.g., AIP reference or ID) is provided to the idle agent. Then a connection is established between the originating and terminating agents. The AIP connector (e.g. a software object with a connector portion and a termination portion) represents the software entity connecting the originating and terminating agents and passes generic AIP messaging between two agents to facilitate communication between the agents. As illustrated in FIG. 2, the translator and router 2000 is the central hub for the agents which are connected to the hub.

If the processed digits are not in the route subtable then, for example, a route nack message is returned to the mobile agent 2011 indicating that there is no route to the destination. If an idle agent 2041 is not available, then a select nack message is returned by the ISUP agent group 2040 indicating that no circuit is available. If an idle agent 2041 is available, however, the translator and router 2000 then returns a route ack message to the originating agent including the route name (e.g., the agent group name) and the AIP reference as described above.

An exemplary flow of messages utilizing the AIP connector according to an embodiment of the present invention is illustrated in FIG. 3. As shown in FIG. 3, all of the messages pass through the AIP according to an embodiment of the present invention. The SETUP messages contain the called number and are used to initiate call termination with the called number.

The SETUP ACK messages represent an acknowledgment that call termination with the called party is proceeding. ALERTING messages are used to indicate that the far end (e.g., the called party's network) has commenced establishing the call termination. The ANSWER messages indicate that the far end has answered the call. The RELEASE messages indicate that the near end (e.g., the calling party) or the far end has released the call connection.

Once the originating and terminating agents are connected via the AIP connection, call setup messaging can be communicated between the agents by the originating agent converting the format of its call setup messages to the AIP and the terminating agent receiving the AIP formatted messages and converting the AIP messages to the terminating agent's format. Thus, for example, in the above example, a mobile originating agent 2011 converts the mobile formatted messages to the AIP and an ISUP terminating agent 2041 converts the AIP formatted messages to ISUP formatted messages. For example, the native protocol for each call type is defined by industry standards and includes message fields that can be mapped to, for example the appropriate exemplary fields of the AIP according to the present invention described below. As is obvious to those skilled in the art, the particular implementation of an agent interworking protocol (AIP) can vary as long as each agent contains the capability of converting to and from a standard protocol, referred to here as AIP. Further, in an object oriented implementation of the present invention, the native protocols for each agent as well as a generic protocol can be stored in a memory of for example a switching center as objects. The objects include, for example, the call messages for each protocol. A translation object could also be stored in the memory of the switching center to provide, for each agent, the mapping of messages between the native protocol for the agent and the generic protocol. An exemplary protocol definition for the AIP is set forth below, although varying implementations of the AIP accomplishing the function of a generic protocol used to establish, maintain and release a connection between two call processing agents are within the scope of the present invention.

The AIP according to an embodiment of the present invention includes several types of messages. Each message element can use, for example, instances of ObjecTime case tool data types, although any structure consisting of data elements could be used. For example, most message elements are instances of a basic type such as Integer and String. Other messagje elements are instances of a grouping of the basic data types or user defined enumerated types described in detail below. Each message element can be optional (O) or mandatory (M). For example, the aipSetup message is used to initiate a dialog between two call processing agents. It is sent from originator agent to terminator agent and includes, for example, the following message elements illustrated in Table 1.

TABLE 1

| ME | Type | Presence |
|---|---|---|
| route | STRING | M |
| cdrId | INTEGER | O |
| connId | INTEGER | O |
| trunkGroupID | INTEGER | O |
| cellid | MSCCellIdentity | O |
| cpc | INTEGER | O |
| continuity | INTEGER | O |
| echoControl | MSCEchoControl | O |
| ss7Interworking | INTEGER | O |
| calledPartyAddress | MSCGsmNumber | O |
| callingPartyAddress | MSCGsmCallingNum | O |
| originalCalledPartyAddress | MSCGsmOrigCalledNum | O |
| redirectingPartyAddress | MSCGsmRedirectingNum | O |
| satellite | INTEGER | O |
| redirInfo | MSCGsmRedirInfo | O |

The exemplary message elements (ME) shown in Table 1 are described as follows. The callingPartyAddress message element is to identify the calling party. The route message element is to identify the agent group of the originator agent. The cdrId message element is to identify the Call Data Record ID of the originator agent. The connId message element is to identify the switching matrix connection for the call. The cellid message element is to identify the cell in which the traffic channel was assigned. It is provided, for example, if the originator agent is processing an emergency call.

The cpc message element contains the Calling Party Category. This field is used by GSM and ISUP agents. The satellite message element is to identify if one or more satellites are involved in the current call. This is important to know because the delay caused by satellite links affects the overall quality of calls and therefore, when possible, multiple satellite hops are avoided. The continuity message eletment is to pass information about the status of SS7 continuity checking for the current call. If Continuity is not supported, then this message element will always have the default value of'contNotRequired'. The echoControl message element is to pass information about whether echo devices are already included in a call or need to be inserted in certain situations. If Echo Control is not supported, this message would have the default value of 'ogEchoDevNotIncluded'. The ss7Interworking message element is to pass information about whether the call is all ss7 or whether PSTN interworking (R1, R2, etc.) has occurred.

The calledPartyAddress message element is to pass information about the dialed number including the numbering plan and whether the number is national, international, etc. The callingPartyAddress message element is to pass information about the calling party such as the calling line ID, whether the caller restricts or allows his CLID to be presented. The originalCalledPartyAddress message element is to pass information about the number that a caller was attempting to reach before forwarding redirected the call elsewhere. Information contained includes, for example, the original number that was called and whether that original called party allows his (forwarding) number to be displayed to the forwarded to party. An example use of this information is the situation where multiple people have forwarded phones to the same number. Seeing the original called party as well as the calling party on certain displays can tell not only who is calling, but which of the parties forwarded to this one phone the caller was trying to reach. The redirectingPartyAddress message element is to pass the information about the forwarding party in a call. Example fields are the forwarding party's number and whether the forwarding party allows or restricts his number from being displayed. If only one forwarding occurs in a call, this number will be the same as the original called number, but if multiple forwardings occur, this number will be that of the last forwarding party. An example use of this field is to ensure that if a caller attempts to call a local number that has been forwarded over long-distance, the forwarding party will be charged for the long distance call rather than the calling party that was only trying to make a local call. The redirInfo message element is to pass relevant information about the history of the forwarding of a call (while the redirectingPartyInfo element only has information about the last forwarding, party). Example fields include the number of forwardings done in the call, the original forwarding reason, the last forwarding reason, and certain presentation/restriction information.

Another type of message in an exemplary AIP according to an embodiment of the present invention is the aipSetupAck Message. The aipSetupAck message is used to acknowledge receipt of the aipSetup message and provide information about the terminator agent. It is sent from the terminator agent to the originator agent. Exemplary message elements for a SetupAck Message is shown in Table 2.

TABLE 2

| ME | Type | Presence |
|---|---|---|
| applyRingback | BOOLEAN | M |
| route | STRING | M |
| backwardSetupInfo | MSCGsmBackSetupInfo | O |
| eventInfo | MSCGsmEventInfo | O |

The exemplary message elements (ME) shown in Table 2 are described as follows. The applyRingback message element is to tell whether the switch element 304 (e.g., MSC) needs to connect a ringback tone to the originating agent while the MSC attempts to reach the terminating party. It is set whenever the MSC is the terminating office in a call. The route message element is to identify the agent group of the terminating agent. The backwardSetupInfo message element is to pass information back to the originator agent that SS7 exchanges can use to determine how a call should be set up and what facilities are involved. The eventInfo message element is to pass information backwards toward the originator of the call such as whether the terminator is being rung or if forwarding has occurred (and if so what type of forwarding has occurred).

Another type of message in the AIP according to an embodiment of the present invention is an aipAlerting Message. The aipAlerting message informs the originator agent that the called party's telephone is ringing. It is sent from the terminator agent to the originator agent. Exemplary message elements of the aipAlerting, message are shown in Table 3.

TABLE 3

| ME | Type | Presence |
|---|---|---|
| backwardSetupInfo | MSCGsmBackSetupInfo | O |
| eventInfo | MSCGsmEventInfo | O |

The backwardSetupInfo message element is to pass information back to the originator agent that SS7 exchanges can use to determine how a call should be set up and what facilities are involved. The eventInfo message element is to pass information backwards toward the originator of the call such as whether the terminator is being rung or if forwarding has occurred (and if so what type of forwarding has occurred), and whether information may be presented to the originator.

Another type of message in the AIP according to an embodiment of the present invention is an aipAnswer Message. The aipAnswer message informs the originating agent that the called party has received/accepted the call. It is sent from the terminating agent to the originating agent. An exemplary message element of the aipAlerting message is shown in Table 4.

TABLE 4

| ME | Type | Presence |
|---|---|---|
| backwardSetupInfo | MSCGsmBackSetupInfo | O |

The backwardSetupInfo message element is to pass information back to the originator that SS7 exchanges can use to determine how a call should be set up and what facilities are involved.

Another type of message in the AIP according to an embodiment of the present invention is an aipPlayTone Message. The aipPlayTone message informs the receiver that the sender has requested the application of a DTMF tone at the receiving end. An exemplary message element of the aipPlayTone message is shown in Table 5.

TABLE 5

| ME | Type | Presence |
|---|---|---|
| tone | INTEGER | M |

The tone message element specifics which DTMF tone should be applied.

Another exemplary message of an AIP according to an embodiment of the present invention is an aipStopTone Message. The aipStopTone message informs the receiver that the sender has requested the termination of a DTMF tone at the receiving end. The aipStopTone message will always be preceded by an aipPlayTone message. There are no message elements in this message.

Another exemplary message of an AIP according to an embodiment of the present invention is an aipRelease Message. The aipRelease message informs the receiver that the dialog has been terminated by the sender. It can be sent by either the originator or terminator. No reply to this message is expected or should be sent. Exemplary message elements of the aipRelease message are shown in Table 6.

TABLE 6

| ME | Type | Presence |
|---|---|---|
| cause | INTEGER | M |
| meteringPulses | INTEGER | O |
| location | INTEGER | O |
| disconnectingParty | INTEGER | O |

The cause message element is to provide the reason why the dialog was terminated. The meteringPulses message element is to provide the number of meter pulses received from the superior exchange for the call. The location message element is to provide the location at the network level of the initiator of the dialog release. The disconnectingParty message element indicates whether the calling party, called party or network released the call.

Another exemplary message element of an AIP according to an embodiment of the present invention is an aipRetry message. The aipRetry message has, for example, one element, cause. The cause message element is sent by the terminator trunk to the originator during glare conditions (e.g., attempt to access both paths of a bi-directional bus simultaneously) or a seize failure condition. The cause message element indicates the reason for the failure. Upon receipt of the cause message by the originating agent, the originating agent retries call routing. The AIP according to an embodiment of the present invention can also include user defined message element types. All message elements can use, for example, instances of ObjecTime data types. Most are instances of a basic ObjecTime data types such as INTEGER and STRING, as illustrated in the above tables. Others are instances of a grouping of the basic ObjecTime data types or user defined enumerated types, also as illustrated in the above tables. The type definitions below show the user defined type used in some of the messages above.

MSCCellIdentity Type

| Sub-Element | Type | Presence |
|---|---|---|
| mcc | STRING | M |
| mnc | STRING | M |
| lac | INTEGER | M |
| cid | INTEGER | M |

The mcc sub-element is to specify the Mobile Country Code. The mnc sub-element is to specify the Mobile Network Code. The lac sub-element is to specify the Location Area Code. The cid sub-element is to specify the Cell Identifier.

MSCGsmNumber Type

| Sub-Element | Type | Presence |
|---|---|---|
| digits | STRING | M |
| ton | INTEGER | M |
| npi | INTEGER | M |

The digits field is to carry an address. The ton (type of number) message element is to give information associated with an address indicating the nature of the number. For example, the number could be an international number, a national number, or an ISDN subscriber number. The npi (numbering plan identifier) message element is to give the associated specification used to determine the meaning of the numbers in an address. Examples are the ISUP numbering plan defined in ITU E.164 and the Data Numbering Plan defined in ITU X.121.

MSCGsmCallingNum Type

| Sub-Element | Type | Presence |
|---|---|---|
| digits | STRING | M |
| ton | INTEGER | M |
| npi | INTEGER | M |
| ni | INTEGER | M |
| pi | INTEGER | M |

The digits field is to carry the address of the originating (calling) party in this call. The ton (type of number) message element is to give information associated with an address indicating the nature of the number. For example, the number could be an international number, a national number, or an ISDN subscriber number. The npi (numbering plan identifier) message element is to give the associated specification used to determine the meaning of the numbers in an address. Examples are the ISUP numbering plan defined in ITU E.164 and the Data Numbering Plan defined in ITU X.121. The ni (number incomplete) message element is to tell that though a calling address is included, it is not the complete calling party address. The pi (presentation indicator) message element is to tell whether the address information may be presented to an end user for potential display on a calling line ID device.

| MSCGsmOrigCalledNum Type | | |
|---|---|---|
| Sub-Element | Type | Presence |
| digits | STRING | M |
| ton | INTEGER | M |
| npi | INTEGER | M |
| pi | INTEGER | M |

The purpose of the address digits here is to give the identity of the original party that the caller wished to reach before any forwarding occurred. The ton (type of number) message element is to give information associated with an address indicating the nature of the number. For example, the number could be an international number, a national number, or an ISDN subscriber number. The npi (numbering plan identifier) message element is to give the associated specification used to determine the meaning of the numbers in an address. Examples are the ISUP numbering plan defined in ITU E.164 and the Data Numbering Plan defined in ITU X.121. The pi (presentation indicator) message element is to tell whether the address information may be presented to an end user for potential display on a calling line ID device.

| MSCGsmRedirectingNum Type | | |
|---|---|---|
| Sub-Element | Type | Presence |
| digits | STRING | M |
| ton | INTEGER | M |
| npi | INTEGER | M |
| pi | INTEGER | M |

The purpose of the address digits here is to give the identity of the last party that forwarded the call. If only one forwarding occurs this will be the same as the original called party address. The ton (type of number) message element is to give information associated with an address indicating the nature of the number. For example, the number could be an international number, a national number, or an ISDN subscriber number. The npi (numbering plan identifier) message element is to give the associated specification used to determine the meaning of the numbers in an address. Examples are the ISUP numbering plan defined in ITU E.164 and the Data Numbering Plan defined in ITU X.121. The pi (presentation indicator) message element is to tell whether the address information may be presented to an end user for potential display on a calling line ID device.

| MSCGsmRedirInfo Type | | |
|---|---|---|
| Sub-Element | Type | Presence |
| redirectingInd | INTEGER | M |
| origRedirReason | INTEGER | M |
| redirCounter | INTEGER | M |
| redirReason | INTEGER | M |

The redirectingInd message element is to tell whether the call has been forwarded or rerouted and whether or not presentation of redirection information to the calling party is restricted. The origRedirReason message element is to tell the reason the call was originally redirected. The redirCounter message element is to indicate the number of redirections which have occurred on a call. The redirReason message element is to tell, in the case of a call undergoing multiple redirections, the reason why the last redirection has occurred.

| MSCGsmBackSetupInfo Type | | |
|---|---|---|
| Sub-ELement | Type | Presence |
| chargeInfo | INTEGER | M |
| calledPtyStatus | INTEGER | M |
| ss7Integerworking | INTEGER | M |
| echoControl | MSCEchoControl | M |

The MSCGsmBackSetupInfo type is passed from terminator to originator to indicate the facilities involved in the call setup, e.g., echo cancellers, SS7 interworking or charging. The chargeInfo message element is to tell whether or not the call is chargeable. The calledPtyStatus message element is to tell the state of the called party. For example, 'subscriber free' if the called party is not on a call. The ss7interworking message element is to tell whether or not SS7 is used in all parts of the network connection. The echoControl message element is to pass information about whether echo devices are already included in a call or need to be inserted in certain situations. If Echo Control is not supported, then this message element will have the default value of 'icEchoDevNotIncluded'.

| MSCGsmEventInfo Type | | |
|---|---|---|
| Sub-Element | Type | Presence |
| eventInd | INTEGER | M |
| eventPresentation | INTEGER | M |

The eventInd message element is to give more information about the reason that an aipSetupAck or aipAlerting message has been sent (e.g., to communicate call event information). For example, two reasons these messages are sent are to show further progress in the call or to tell that alerting is occurring. This message element could also pass information about the reason a call was forwarded. The eventPresentation message element is to glve more information about whether information about the progress of the call can be displayed back to the originator of the call. This field can be set true if the forwarding options from eventInd (which may not be used) are the situations in which eventPresentation might be restricted. An example of possible future use is a user could restrict presentation of event information so that the originator could not tell if the call had been forwarded or not.

| MSCEchoControl Type | | |
|---|---|---|
| Sub-Element | Type | Presence |
| enabled | BOOLEAN | M |
| info | INTEGER | M |
| erl | INTEGER | M |

The enabled message element is to pass information about whether a per-trunk echo cancellor is enabled for a specific call. This field gives information only about whether local echo control is on. The info field gives information about whether echo control is being done anywhere in the call (even on other switches). The info message element is to pass information about whether echo control has already been set at the originator or terminator of a call. This information is important because on long calls, if info about whether echo is set or not is not included, then too many or too few echo cancellors may be inserted into the call. The erl (echo return loss) field contains an estimate of the loss associated with echo in this call. The value is taken from the trunk information stored in the OAM server and entered through the NMS. This field is used, for example, to train the echo cancellor.

Another example of the operation of the AIP according to the present invention is a mobile to mobile call. e.g., from a first subscriber terminal 110 to a second subscriber terminal 110 on telecommunications network 100, as shown in FIG. 5. When the first subscriber terminal 110 originates the call, the dialed digits are received at the switching center 304 and the switching center 304 assigns a mobile agent 2011 to set up the originating half of the call between the first mobile subscriber 110 and the switching center 304. The mobile agent 2011 sends a translation request to the translator and router 2000 along with a translation table index. The translator and router 2000 reads the MATCH entries of the appropriate translation table and if a MATCH is found, the corresponding MODIFY digit pattern is returned to the mobile agent 2011, which then sends a routing request to the translator and router 2000 along with a routing table index. The translator and router reads the MATCH entries of the appropriate route table and if a MATCH is found, the ROUTE LIST is used to select an agent group and an idle agent, in this case gateway agent 2021 (e.g., the agent used to connect to another subscriber terminal 110). As described earlier, the selection of a gateway agent 2021 includes the provision of an AIP reference number from the originating agent identifying the connection path that establishes the link between mobile agent 2011 (the originating agent) and gateway agent 2021 (the terminating agent). Gateway agent 2021, using the incoming translated digits from the mobile agent 2011, accesses the home location register (HLR) 504 of the telecommunications system 100 to determine the location of the second subscriber terminal 110. As is known in the art, HLR 504 contains the administrative information associated with each subscriber terminal 110 registered in the telecommunications system 100 along with the current location of each subscriber terminal 110.

The HLR 504 may return the same or a different digit string depending on the location of the second subscriber terminal (e.g., in the network or roaming outside of the network). Using the digit string received from the HLR 504, the gateway agent 2021 (now acting as an originating agent) sends a translation request and a translation table index to the translator and router 2000 to translate the digit pattern. If a MATCH is found, the translated digit pattern is returned to the gateway agent 2021 and a routing requiest and route table index are sent to the translator and router 2000 to determine if there is a MATCH and corresponding ROUTE LIST for the translated digits. Since the call in this example is to a subscriber terminal 110, the ROUTE LIST in the route subtable must include a mobile agent group 2010 (e.g., GSM), which is a pool of mobile connections (e.g., mobile agents 2011) via radio channels. In addition to identifying the mobile agent group 2010 to the gateway agent 2021 (now the originating agent), the gateway agent 2021 will provide an an AIP reference number for the AIP connection path for communication between the gateway agent 2021 and the new terminating agent, in this case a second mobile agent 2011, to complete the connection of the call from the first subscriber terminal 110 to the second subscriber terminal 110.

As is evident from this example, using the AIP according to an embodiment of the present invention allows agents, such as the gateway agent 2021, to communicate with the HLR 504 using the native MAP protocol required to interface with the HLR (via the external interface of agent 2021) and also to communicate with all other agents using AIP (via the internal interface of agent 2021). Further, the use of a generic call message protocol to connect agents allows new agents (e.g., for new call types) to be easily added to the telecommunications system as no integration problems arise due to the generic interface protocol between all agents, whether new or existing.

If in the above example a call forwarding feature was activated by the second subscriber terminal 110 a daisy chain of AIP connections between agents would result, in contrast the operation of conventional communication systems. For example, in conventional communication systems, each agent is required to perform complex tasks in a call forwarding situation such as evaluating the downstream situation and taking appropriate action such as breaking down the existing connection and establishing a new connection to get to the desired destination. In contrast, using the AIP connection between agents according to an embodiment of the present invention allows agents to be easily connected in a daisy chain until the destination agent is reached without requiring complicated tasks be performed by each agent other than conversion between the AIP and an agent's native protocol.

For example, according to an embodiment of the present invention, the first mobile agent 2011 and the gateway agent 2021 in the previous example would be connected via an AIP connection, and the gateway agent 2021 and the second mobile agent 2011 would be connected by a separate AIP connection. If the second mobile agent 2011 determined that call forwarding was activated for the second subscriber terminal 110 or that the call needed to be redirected for any reason, then, in the same manner described in detail above via interaction with the translator and router 2000, the second mobile agent 2011 would obtain an AIP connection with the agent responsible for establishing the connection with the forwarded number, which could be another subscriber terminal 110 invoking a third mobile agent 2011 or a network connection requiring one or more IUSP, TUP or R2 agents to complete the call, as shown in FIG. 5. Thus, a chain of agents can be daisy-chained together using the AIP protocol thereby providing an elegant building block concept for handling call forwarding not provided by conventional communication systems that also reduces the processing capabilities required by each agent. As noted earlier, using the AIP according to an embodiment of the present invention is not required to practice the call processing architecture according to the present invention and could be used with other call processing architectures, but does provide a further improvement on the operation of the call processing architecture according to the present invention.

What is claimed is:

1. A method for establishing a call connection, comprising the steps of:

receiving a call request signal from a first communication system;

assigning an originating agent to establish a first call half connection with the first communication system;

processing the call request signal to generate a processed call request signal;

determining a route for the call connection as a function of the processed call request signal;

assigning a terminating agent as a function of the route, the terminating agent establishing a second call half connection with a destination of the call connection; and connecting the originating agent and the terminating agent to establish the call connection.

2. The method according to claim 1, wherein the call request signal includes dialed digits of a called party.

3. The method according to claim 1, wherein the first communication system includes one of a PLMN and a PSTN.

4. The method according to claim 1, wherein the originating agent and the terminating agent each include a software entity providing a call state machine for a predetermined call type.

5. The method according to claim 4, wherein the predetermined call type includes one of GSM, ISUP, R2 and TUP.

6. The method according to claim 1, wherein the steps of processing the call request signal and determining a route are performed via a translator and router function interacting with the originating agent.

7. The method according to claim 1, wherein the step of connecting the originating agent and the terminating agent further includes connecting the originating agent to the terminating agent via one of a native protocol of the terminating agent and a generic protocol.

8. A method for establishing a call connection, comprising the steps of:

converting, in a first agent of a first communication system, a call setup message from a first agent format to a standard format;

transmitting the standard format call setup message to a second agent of the first communication system, the second agent being associated with a destination of the call connection; and converting, in the second agent of the first communication system, the standard format call setup message to a second agent format call setup message.

9. The method according to claim 8, wherein the first communication system and the destination of the call connection include one of a PLMN, a PSTN and an optical fiber telecommunication system.

10. The method according to claim 8, wherein the first agent and the second agent include one of a mobile agent, an ISUP agent, a R2 agent and a TUP agent.

11. The method according to claim 8, further comprising the steps of:

determining, via the second agent, that the call connection is to be redirected to a second destination;

converting the second agent format call setup message to the standard format;

transmitting the standard format call setup message to a third agent of the first communication system, the third agent being associated with the second destination of the call connection, and converting, in the third agent of the first communication system, the standard format call setup message to a third agent format call setup message.

12. A memory for storing data for access by an application program being executed on a computer system, comprising:

a standard protocol object stored in the memory, the standard protocol object including a predetermined set of standard messages;

at least one unique protocol object stored in the memory, the at least one unique protocol object including a predetermined set of unique messages, each message in the predetermined set of standard messages corresponding to a respective one of the plurality of unique messages to provide a generic protocol to establish a call connection between a first processing agent and a second processing agent; and a translation object stored in the memory to provide an association between the predetermined set of unique messages and the predetermined set of standard messages.

13. The memory according to claim 12, wherein the at least one unique protocol object includes one of an ISUP protocol object, an R2 protocol object, a GSM protocol object and a TUP protocol object.

* * * * *